Patented Aug. 8, 1939

2,168,374

UNITED STATES PATENT OFFICE 2,168,374

CHEMICAL COMPOUNDS AND PRODUCTS PRODUCED THEREFROM

Clifford J. B. Thor, Chicago, Ill., assignor to The Visking Corporation, Chicago, Ill., a corporation of Virginia No Drawing. Application July 9, 1936, Serial No. 89,768

21 Claims. (Cl. 260—210)

This invention relates to new chemical compounds and products produced therefrom. More particularly, this invention relates to chitin compounds or derivatives and articles produced therefrom, as well as methods of producing the chitin compound and the products therefrom.

Chitin is generally considered to be composed of polymerized or condensed mono acetyl hexosamine units. It has widespread occurrence in nature as a structural material chiefly in arthropod exo-skeletons and in the cell walls of numerous fungi. It is also available in large quantities from the refuse of crustacean fisheries, which at present is of little use other than as fertilizer and also to a limited extent as a high protein feed stock. Chitin can be easily removed from materials containing it and purified. The common and well-known procedures for obtaining chitin from, for example, crustacean refuse consist generally in converting the insoluble calcium salts into soluble calcium salts, removing the soluble calcium salts, treating the thoroughly washed residue with an alkali, preferably at an elevated temperature, to convert the adhering protein and other organic materials into a state capable of removal by filtration, and filtering. The residue is thoroughly washed with water and dried. According to this procedure, the residue is a light pink or almost white flaked preparation of relatively pure chitin. If desired, the chitin may be bleached. Though the obtaining and purifying of chitin is relatively cheap, and even though chitin has some very valuable characteristics, such as being relatively chemically inert, nevertheless chitin has up to the present time no extensive commercial use in the arts and industry.

I have found that I can produce various new chemical compounds of chitin which have many uses in the arts and industries. For example, I have found that I can produce alkali chitin in which the equivalents of alkali metal (Na or K) bound per acetyl hexosamine unit may greatly vary, depending on the conditions of the treatment. This alkali chitin, I have found, can be used in the preparation of still other chitin compounds. It can be used, for example, in synthetic reactions of the heterogeneous type, such as xanthation, etherification by means of alkylene oxides or active halogen compounds, and other reactions which alkali metal alcoholates undergo.

I have also found that I can, as previously mentioned, xanthate the alkali chitin, thus producing a new chemical compound, i. e. chitin xanthate. I have further found that I can regenerate chitin from chitin xanthate. Thus, by extruding the chitin compositions through nozzles or orifices of the desired shapes and sizes into a suitable coagulating and regenerating bath, I can produce regenerated chitin articles, such as filaments, threads, films, ribbons, tubes, straws, etc.

It is, therefore, an object of this invention to provide new chemical compounds of chitin and methods of preparing the same.

Another object of this invention is to provide alkali chitin and method of producing the same.

Other objects of this invention will become apparent from the following description and appended claims.

For the sake of convenience, hereafter there will be set forth a general procedure for producing articles of regenerated chitin. In carrying out the process of producing these articles, it becomes necessary to produce several new chitin compounds. It is to be understood that the chemical compounds which are produced in carrying out the preferred embodiment of the invention in the making of regenerated chitin articles are not restricted to the precise use to which they are put in this method, but are capable of use for many purposes, several of which will also be hereinafter explained.

To produce, according to my invention, a regenerated chitin article, chitin obtained in any known manner, with or without bleaching as desired, is treated with a caustic alkali for a sufficient length of time and under appropriate conditions to produce an alkali chitin having the desired alkali content, as will be hereinafter more fully explained. The alkali chitin, preferably after shredding and preferably also without aging, is xanthated. The xanthation may be carried out under such conditions as to produce a viscous dispersion of chitin xanthate having the desired water, chitin and alkali contents. Alternatively, the xanthation may be carried out under conditions producing chitin xanthate which subsequently may be formed into a viscous dispersion of the desired concentrations. The viscous dispersion of chitin xanthate, after deaeration and filtration to remove foreign substances, is extruded through any desired nozzle or orifice into a suitable coagulating and regenerating bath. After regeneration, the regenerated chitin article, while in the gel state, is treated in order to remove deleterious or undesirable compounds produced during the process. If desired, the article may also be bleached. In the case of films, threads, etc., the products may be treated with a conditioning agent prior to drying, and then thereafter dried in the usual manner.

Articles produced in the manner previously mentioned are composed of unchanged chitin. They are non-fibrous, colorless, transparent and possess good strength in the dry state. Chitin products take up water readily and in so doing assume a soft texture and have a slimy feel. Like the original chitin, the regenerated material is insoluble in water, dilute acids, dilute alkalis and all organic solvents.

In order to produce alkali chitin, I treat chitin with a caustic solution, preferably by steeping the chitin in a caustic solution. I have found that alkali chitin hydrolyzes so easily that for its formation it is highly preferable and advantageous to employ a steep caustic solution of high concentration and relatively low free water content. By "free water content" I mean water which is present simply as a free solvent. For example, in a 40% to 50% caustic soda solution, although the water content is high, it is known that at ordinary temperature conditions a large proportion of this water is combined with the sodium hydroxide as water of hydration rather than being present simply as a free solvent.

In the course of my research, I found that chitin treated or steeped with aqueous caustic alkali solutions combines with increasing amounts of alkali, depending on the concentration of the steeping caustic solution. The following table shows that the quantity of alkali combining with chitin at room temperature (25° C.) increases as the concentration of the steep caustic increases:

| Percent NaOH in steep caustic | Equivalents of Na bound per acetyl hexosamine unit |
|---|---|
| 28.1 | .15 |
| 30.1 | .17 |
| 31.2 | .23 |
| 32.1 | .29 |
| 33.0 | .41 |
| 34.0 | .53 |
| 34.9 | .67 |
| 35.9 | .71 |
| 36.9 | .75 |
| 37.8 | .77 |
| 38.9 | .79 |
| 39.8 | .81 |
| 41.0 | .86 |
| 41.9 | .84 |
| 42.8 | .88 |
| 43.9 | .85 |
| 45.2 | .86 |
| 46.0 | .85 |
| 47.1 | .90 |
| 48.0 | .91 |
| 48.9 | .92 |
| 50.0 | .90 |

While alkali chitin would undoubtedly form in caustic steeping liquors of concentrations higher than 50%, it is believed that this would be impractical and inadvisable, due to excessive amounts of caustic soda necessarily held by the product in a mechanical way.

The extent of combination of chitin with alkali also depends on the temperature conditions. This is particularly the case when the lower concentrations of steep liquor are used. With the lower concentrations, the combination of chitin and alkali is increased if the operation is carried out at lower temperatures. Thus, for example, the extent of combination of alkali with the chitin is 0.48 and 0.56 equivalents per acetyl hexosamine unit when the steeping is carried out at 2° C. to 5° C. and the steep caustic concentrations are 30.3 and 32.3 respectively.

In any concentration of steep caustic in which the formation of alkali chitin occurs, the minimum temperature which may be used is the temperature at which the particular concentration of caustic used in the process would crystallize or solidify. The maximum temperature which may be employed in the process likewise varies with the concentration of the steep caustic used and is generally limited by the amount of combined alkali which may be desired in the alkali chitin for any specific purpose. Since the chitin is not to be deacetylated, the maximum temperature is also below that at which the chitin would be deacetylated. Generally, it is desirable and preferable to work at somewhat below the maximum permissible temperature in any case, since the lower temperatures are not only conducive to increased combination of alkali but also would tend to minimize the possibility of partial deacetylation of the chitin by the alkali. No advantage is to be gained by working above ordinary room or plane temperatures, while reductions in temperature, in so far as practical, would always be an advantage from the chemical standpoint. If, for example, an alkali chitin containing 0.75 or more equivalents of combined Na per acetyl hexosamine unit is desired, the maximum temperature is somewhat above 25° C. when the caustic concentration range of the steep liquor is 40% to 50%, and approximately 25° C. when the caustic concentration range is 37% to 39%, and progressively below 25° C. as the caustic concentration drops from 37% to 30%. Thus, soda or alkali chitin containing 0.75 or more equivalents of combined Na per acetyl hexosamine unit may be prepared by steeping purified chitin for a suitable period of time in 38% to 50% aqueous caustic steep liquor at ordinary room temperature or in somewhat dilute caustic steep liquor if the temperature of the operation is proportionally lowered.

After the chitin has been treated or steeped with the caustic steep liquor of appropriate concentration and under the selected temperature conditions for the required period of time, the excess caustic steep liquor is removed in any convenient manner, such as by pressing. The pressing may be carried out to remove as much steep liquor as desired. Usually, the pressing is such as to give an alkali chitin weighing approximately three times as much as the chitin originally used and containing an excess of steep liquor.

Though the alkali chitin has been hereinbefore previously described as being prepared with caustic soda steep liquors, it is to be understood that other caustic alkali steep liquors may be used. Potassium hydroxide is illustrative of another caustic alkali which may be employed to produce alkali chitin. When potassium hydroxide is employed, the conditions previously mentioned in connection with the use of caustic alkali may be used.

Alkali chitin prepared as previously described may be used in synthetic reactions of the heterogeneous type, such as xanthation, etherification by means of alkylene oxides or active halogen compounds, or other reactions which alkali metal alcoholates undergo.

Alkali chitin may be dispersed in an aqueous medium. In order to disperse alkali chitin in an aqueous medium, the operation should preferably be carried out at a temperature in the neighborhood of 0° C. or lower. One illustrative procedure for dispersing alkali chitin in water is to mix the alkali chitin with the desired quantity of crushed ice which, in contact with the caustic soda in the alkali chitin, provides a freezing mixture. It is obvious that the final alkali chitin content of the dispersion may be varied within wide limits. Generally, the alkali chitin content depends on the use to which the final dispersion is to be put. It has been found that, when the dispersions of alkali chitin are to be used for xanthation, combination with active halogen compounds, etc., it is preferable that the alkali chitin content in the dispersion be of the order of 6% to 7%.

In order to more clearly explain the phase of the invention relating to the production of alkali chitin, there are hereafter set forth several illustrative specific examples of producing alkali chitin. It is, of course, to be understood that the production of alkali chitin as set forth in the specific examples is not limitative of the instant invention:

Example 1

300 grams of chitin flakes, such as are prepared from "shrimp bran", are steeped in 6 liters of 35% NaOH at 0° C. for 2 hours. Excess caustic solution is then removed by pressing. The resulting alkali chitin is kept cold until desired for further use. It will contain approximately .70 equivalents of combined Na per acetyl hexosamine unit.

Example 2

300 grams of chitin flakes are steeped in 6 liters or more of 40% NaOH at room temperature (25° C.) or lower for 2 hours. The excess caustic may be removed by pressing in any convenient manner to give an alkali chitin weighing slightly less than 3 times as much as the original chitin. This product contains approximately .80 equivalents of combined Na per acetyl hexosamine unit.

Example 3

300 grams of chitin are steeped in 6 liters of 50% NaOH for 2 hours at room temperature, with occasional or continuous stirring. Excess caustic solution is removed by pressing until the weight of the alkali chitin is approximately 3 times the weight of the chitin used. It will contain approximately .90 equivalents of combined Na per acetyl hexosamine unit.

Example 4

An unaged press cake of alkali chitin, as produced in Examples 1, 2 or 3, is shredded and mixed in a suitable device with 3 to 3.5 kgs. of crushed ice for ½ hour, whereby an aqueous dispersion of alkali chitin is produced. It may be kept in a suitable container, preferably at near 0° C., until used.

As previously indicated, when it is desired to produce articles formed of regenerated chitin, it is necessary to produce chitin xanthate from which the chitin is later regenerated. The xanthation of chitin may be carried out in several ways. According to one procedure, a cold dispersion of alkali chitin prepared as hereinbefore described and having the desired chitin and alkali contents, such as, for example, 6% to 8% of chitin, is mixed at a temperature of from −10° C. to +15° C. in a suitably jacketed and cooled apparatus with such quantity of carbon bisulphide and for such a time until the desired degree of xanthation is secured. Generally, the amount of carbon bisulphide employed will be between ¼ and ½ the weight of the original chitin, and the time, from approximately 2 to 10 hours. The resulting dispersion of chitin xanthate is considerably more stable than that of the alkali chitin itself, especially at room temperature.

Another procedure for producing dispersions of chitin xanthate contemplates agitating relatively dry alkali chitin, preferably unaged, in a closed container with a quantity of carbon bisulphide equal to ¼ to ½ of the weight of the original chitin from 1 to 6 hours. This procedure usually results in a partial xanthation of the chitin which, however, aids in the dispersion process. Thereafter, without removal of any excess carbon bisulphide, the dispersion of the partially xanthated alkali chitin is secured by adding the desired amount of water under conditions which maintain a temperature between −10° C. and +15° C. throughout the mixture. This can be done by adding all of the water in the form of crushed ice and thoroughly mixing the same with the partially xanthated chitin. The resulting dispersion may then be further mixed with external cooling, while the xanthation process goes to completion or it may be allowed to stand in a closed vessel in a cold room at about 0° C. for several hours. After this stage, a final thorough mixing is advantageous.

The caustic soda (NaOH) content of the dispersion can be controlled within limits by the concentration of the steep caustic used in the production of the alkali chitin, by the efficiency of the removal of the excess steep caustic, or, if desired, by the addition of caustic soda after the first xanthation treatment. The addition of caustic soda during the dispersion process is not necessary and usually undesirable, because the alkali chitin contains an adequate amount. For example, if the chitin is steeped in 38% NaOH and the alkali chitin pressed to 3 times the weight of the original chitin and the quantity of ice used is such as to give a chitin content of 7% in the final dispersion, the sodium hydroxide content will be approximately 6%. Under exactly similar conditions using 50% steep caustic, the NaOH content will be approximately 8% when the chitin content is 7%. These figures represent practically the lower limits of NaOH concentration attainable in a final dispersion of chitin xanthate containing 7% of chitin at the two extremes of steep caustic concentration, between which room temperatures steeping is successful. Obviously, if the efficiency of the pressing of the alkali chitin is less than indicated, the alkali content of the final dispersion necessarily will be greater than these minimum values.

The chitin xanthate dispersion is best stored at somewhat below room temperature. Prolonged storage at room temperature results in some deacetylation of the chitin which may be detrimental to the quality of films, threads, etc. produced from it. Storage, however, does not result in gelling or precipitation of the chitin, except after more extended periods of time. The extent of deacetylation of the chitin under such conditions varies with the alkali content of the final dispersion. If the dispersion of chitin xanthate is to be used in the production of regenerated chitin articles, such as films, threads, filaments, etc., the dispersion is filtered and deaerated after the production of the same and prior to extrusion thereof.

Hereinafter are set forth several illustrative examples of procedures for producing chitin xanthate dispersions:

Example 5

300 grams of purified chitin secured in any manner are steeped in 6 liters of 50% NaOH at room temperature (25° C.) for 2 hours. Sufficient excess caustic is removed by pressing to give a press cake weighing approximately 900 grams. The press cake of alkali chitin is shredded and the unaged shredded alkali chitin is mixed with 3 to 3.5 kgs. of crushed ice and 100 cc. of carbon bisulphide. Mixing is continued in a closed mixer at a temperature of not over 10° C. for several hours until the free carbon bisulphide has disappeared.

The resulting viscous dispersion of chitin xanthate, which has a caustic alkali content (NaOH) of 7.5% to 8.4% and a chitin content of 6.6% to 7.4%, is filtered and deaerated.

*Example 6*

150 grams of purified chitin obtained in any manner are steeped in 3 liters of 40% NaOH at room temperature (25° C.) or lower for 2 hours. Sufficient excess caustic is removed by pressing to give a press cake weighing about 450 grams. The press cake is shredded and then shaken in a closed vessel with 60 cc. of carbon bisulphide for 4 hours at 25° C., after which the mixture is transferred to a 1 gallon thermos jug and mixed with 1600 grams of crushed ice. Mixing is continued for 1 hour, then the jug is closed and allowed to stand for 12 to 16 hours. After this period the dispersion is mixed thoroughly, filtered and deaerated. This dispersion has caustic alkali content (NaOH) of 6.5% and a chitin content of 7.0%.

*Example 7*

300 grams of purified chitin obtained in any manner are steeped in 6 liters of 50% NaOH at room temperature (25° C.) for 2 hours, after which excess caustic is removed by pressing to give a press cake weighing about 960 grams. The unaged alkali chitin, preferably after shredding, is shaken in a closed container with 120 cc. of carbon bisulphide for 5 hours at 25° C. The partially xanthated mixture, still containing free carbon bisulphide, is mixed in a power mixer with 3,175 grams of crushed ice for ½ hour and then transferred to a container which is closed and kept at near 0° C. for 12 to 16 hours. The dispersion is again mixed in the mixer for 1 hour, then filtered and deaerated in vacuo. A viscous dispersion of chitin xanthate containing about 7% chitin and 8.5% caustic alkali content (NaOH) is obtained.

When the chitin xanthate composition is to be used in the manufacture of articles of regenerated chitin, it is preferred that the said composition contain 6% to 8% of chitin and 5% to 9% of alkalinity calculated as caustic soda (NaOH), and specifically 7% chitin, and 7%, and preferably 6%, alkalinity calculated as caustic soda (NaOH).

To produce articles of regenerated chitin such as, for example, filaments, threads, films, ribbons, tubes, straws and the like of a chitin xanthate composition, preferably prepared as above mentioned and preferably after filtration and deaeration, is extruded through any desired nozzle or orifice into a suitable coagulating and regenerating bath. If, for example, threads are desired to be produced, the chitin xanthate composition is extruded through well-known spinnerets having orifices of a number and size depending on the size of thread to be produced. If films are desired to be produced, then the chitin xanthate composition is extruded through an elongated slot in the bottom of the hopper. When ribbons are desired to be produced, the slot may be of dimensions commensurate with the desired width of the ribbon. Alternatively, a spinneret may be used with a slot of appropriate size. When tubes are desired, the composition is extruded through annular orifices.

The coagulating and regenerating bath may be of the acid-salt type, preferably containing a mineral acid and a sulphate. Though various mineral acids and salts and mixtures thereof may be used, I prefer to use sulphuric acid and ammonium sulphate. The acid and salt concentrations may vary within wide limits. Baths containing 20% to 40% of ammonium sulphate and from 4% to 10% sulphuric acid and specifically 30% of ammonium sulphate and 5% of sulphuric acid have been found to give satisfactory results. It is to be understood that various compounds and substances may also be incorporated in the bath to impart certain described characteristics to the product.

After the chitin has been regenerated, the articles, preferably while in the gel state, are subjected to fluid treatments to remove undesirable substances from the product. For example, the articles are given several water washes and preferably also one including a very dilute solution of an alkali, such as ½% to 1% of ammonia, to expedite and facilitate the removal of the sulphuric acid.

If desired, the articles while still in the gel state and after washing may be subjected to desulphuring and bleaching operations. Any well-known desulphuring composition and bleaching composition may be employed. Between the various fluid treatments the product is washed with water to remove the excess composition or liquor from the product. Finally, the article is dried in any well-known manner.

If the regenerated chitin article is of the type which requires conditioning or softening, such as films, tubes, etc., the softening or conditioning agent is incorporated into the product in an operation continuous with the process of producing the same. This is usually effected prior to the drying of the article. As a suitable softening agent glycerol may be mentioned. In the preferred embodiment of the invention the regenerated chitin article is passed through an aqueous bath containing 10% to 20% and specifically 15% of glycerin prior to drying.

The foregoing procedure, since all of the operations may be carried out in a continuous manner, is admirably suitable and is preferred for the production of regenerated chitin films, tubing, etc.

When filaments or threads or the like are to be produced, this can be accomplished by utilizing the well-known spinning machines of either the bobbin or bucket type. After the threads or filaments have been collected in or on the selected collecting device, i. e. bobbin or bucket, the packages of yarn may then be subjected to the necessary fluid treatments. In the production of yarn, the filaments or threads may be stretched while in the gel state in order to improve the physical properties of the yarn in the same manner as is employed in the production of rayon from regenerated cellulose by either the viscose or cuprammonium cellulose process.

In the production of artificial threads various sizes thereof may be produced, this depending to a great extent on the size of the spinneret orifices. In connection with the production of films, this, too, depends to a considerable extent on the size of the slot through which the composition is extruded. Regenerated chitin films ranging in thickness from 0.0005" to 0.004" have been produced, though it is apparent that films of greater or lesser thicknesses may also be produced.

Hereafter is set forth an illustrative procedure for making regenerated chitin articles.

Example 8

A chitin xanthate dispersion is prepared in one of the manners previously set forth and specifically in accordance with the process set forth in Examples 6 and 7 to contain 7% chitin and an alkalinity calculated as NaOH of 7%. The chitin xanthate dispersion, after filtering to free the same of suspended matter and deaeration in vacuo, is extruded from the desired type of nozzle or orifice, which is preferably submerged, in a coagulating and regenerating bath consisting of 30% ammonium sulphate and 5% sulphuric acid. The extruded product is maintained in contact with the bath until regeneration of the chitin is complete, i. e. until substantially all brown color is dispersed and the product is white or grayish white. It is then washed in several changes of water, ½% of ammonia and water again, after which it is immersed in 15% aqueous glycerin bath for 15 minutes, squeezed free of surplus glycerin solution and dried preferably under tension.

Regenerated chitin articles produced as previously mentioned, in addition to possessing the properties also previously mentioned, are colorless, transparent and possess good strength in the dry state. Regenerated chitin articles take up water readily and in so doing assume a soft texture and have a slimy feel. Like the original chitin a regenerated article is insoluble in water, dilute acids and all organic solvents.

If it is desired to produce an opaque or low luster product, this can be done by incorporating into the casting or extruding solution a pigment or pigment-like material. For example, titanium oxide, barium sulphate, zinc oxide, antimony oxide, etc. may be incorporated. Likewise, if a colored product is desired, a suitable dyestuff or pigment may be incorporated in the spinning or casting composition.

If it is desired to produce a moistureproofed regenerated chitin film which can be used as a moistureproof wrapping tissue, the regenerated chitin sheet may be moistureproofed by coating the same with any of the well-known moistureproofing compositions.

I have found that I can produce flexible, transparent or opaque articles of the type previously described composed of regenerated chitin and regenerated cellulose homogeneously blended together by extruding a composition containing cellulose xanthate or viscose and chitin xanthate and processing said articles as hereinabove described. The properties of such products naturally vary with the ratio of chitin to cellulose. When the ratio of chitin to cellulose is as low as 1:2, some of the properties of the corresponding chitin article are still evident.

When the spinning or casting solution contains a high proportion of chitin relative to the cellulose, an acid-salt coagulating bath of the type previously described may be used. On the other hand, when the spinning or casting solution contains a chitin content which with respect to the cellulose is low, a coagulating bath of lower acid and salt content may be used.

In addition to the previously mentioned properties of flexibility, transparency, etc., regenerated chitin tubing made as previously described possesses several properties which make it especially suitable for certain types of sausage casings. A seamless regenerated chitin sausage casing can be produced by extruding chitin xanthate compositions through an annular orifice utilizing the processes hereinbefore described and equipment now used in the production of cellulose sausage casings. For example, the apparatus and mechanical mode of operation set forth in United States Patents Nos. 1,601,686, 1,612,508, 1,612,509, 1,645,050, 1,654,253, 1,908,892, 1,967,773 and 1,976,438 may be employed.

The wall thickness of the sausage casing may vary within wide limits, for example from 0.0005" to 0.004". In the preferred embodiment of the invention, however, it is preferred that sausage casings have a wall thickness of the order of 0.001". Seamless regenerated chitin sausage casings, when stuffed with fresh meat, such as ground pork sausage meat, shrink down with the meat when cooked in the ordinary manner, such as frying, broiling, etc. and in no way interfere with the taste, quality or texture of the cooked product. This is a feature which is not found in any of the synthetic sausage casings now on the market.

Since it is obvious that various changes and modifications may be made in the above description without departing from the nature or spirit thereof, this invention is not restricted thereto except as set forth in the appended claims.

I claim:
1. Alkali metal chitin and containing alkali steep liquor.
2. Alkali chitin having 0.15 to 0.90 equivalents of alkali metal per acetyl hexosamine unit and containing alkali steep liquor.
3. Alkali metal chitin havin 0.15 to 0.95 equivalents of Na bound per acetyl hexosamine unit and containing alkali steep liquor.
4. An aqueous dispersion of alkali metal chitin.
5. An aqueous dispersion containing alkali metal chitin in an amount of the order of 6%–7%.
6. An aqueous dispersion of alkali chitin, said alkali chitin having 0.70 to 0.95 equivalents of Na bound per acetyl hexosamine unit.
7. An aqueous dispersion of alkali chitin, said alkali chitin having 0.70 to 0.95 equivalents of alkali metal per acetyl hexosamine unit.
8. A process of preparing alkali chitin which comprises steeping chitin in a caustic alkali steep liquor of a relatively high alkali concentration and a relatively low concentration of free water at a temperature which is not lower than the temperature at which the caustic alkali steep liquor used would crystallize, said temperature being below that at which the chitin will be deacetylated.
9. A process of preparing alkali chitin which comprises steeping chitin in an aqueous caustic soda solution containing 38% to 50% of sodium hydroxide at a temperature which is not lower than that at which the said caustic soda solution would crystallize and lower than that at which the chitin will be deacetylated.
10. A process of preparing alkali chitin which comprises steeping chitin in an aqueous caustic soda solution containing from approximately 28% to 38% of sodium hydroxide at a temperature below 25° C.
11. A process of preparing alkali chitin which comprises steeping chitin in a caustic alkali steep liquor of a relatively high alkali concentration and a relatively low concentration of free water at a temperature which is not lower than the temperature at which the caustic alkali steep liquor used would crystallize, said temperature being below that at which the chitin will be deacetylated, and removing the excess steep liquor in an amount to give a product having a weight of approximately 3 times the weight of the original chitin.

12. A process of preparing an alkali chitin dispersion which comprises producing alkali chitin and mixing the alkali chitin with water at a temperature not higher than approximately 0° C., the proportions of the ingredients depending on the desired concentrations in the product.

13. A method of preparing an alkali chitin dispersion which comprises producing alkali chitin, and mixing the alkali chitin with crushed ice, the proportions of the ingredients depending on the desired concentrations in the product.

14. A method of preparing alkali chitin which comprises steeping chitin in a caustic alkali steep liquor having a relatively low concentration of free water at a temperature which is not lower than that at which said steep liquor would crystallize and lower than that at which the chitin would be deacetylated, the concentration of said steep liquor being such as to produce alkali chitin having 0.15 to 0.95 equivalents of alkali metal bound per acetyl hexosamine unit.

15. A method of preparing alkali chitin which comprises steeping chitin in a caustic alkali steep liquor having a relatively low concentration of free water at a temperature which is not lower than that at which said steep liquor would crystallize and lower than that at which the chitin would be deacetylated, the concentration of said steep liquor being such as to produce alkali chitin having 0.70 to 0.95 equivalents of alkali metal bound per acetyl hexosamine unit.

16. A method of preparing alkali chitin dispersions which comprises steeping chitin in a caustic alkali steep liquor having a relatively low concentration of free water at a temperature which is not lower than that at which said steep liquor would crystallize and lower than that at which the chitin would be deacetylated, the concentration of said steep liquor being such as to produce alkali chitin having 0.15 to 0.95 equivalents of alkali metal bound per acetyl hexosamine unit, removing the excess steep liquor, and dispersing the resulting product in water at a temperature not higher than 0° C.

17. A method of preparing alkali chitin dispersions which comprises steeping chitin in a caustic alkali steep liquor having a relatively low concentration of free water at a temperature which is not lower than that at which said steep liquor would crystallize and lower than that at which the chitin would be deacetylated, the concentration of said steep liquor being such as to produce alkali chitin having 0.70 to 0.95 equivalents of alkali metal bound per acetyl hexosamine unit, removing the excess steep liquor, and dispersing the resultant product in water at a temperature not higher than 0° C.

18. A method of preparing alkali chitin dispersions which comprises steeping chitin in a caustic alkali steep liquor having a relatively low concentration of free water at a temperature which is not lower than that at which said steep liquor would crystallize and lower than that at which the chitin would be deacetylated, the concentration of said steep liquor being such as to produce alkali chitin having 0.15 to 0.95 equivalents of alkali metal bound per acetyl hexosamine unit, removing the the excess steep liquor to provide a product having a weight approximately 3 times the weight of the original chitin, and mixing the resulting product with crushed ice.

19. A method of preparing alkali chitin dispersions which comprises steeping chitin in a caustic alkali steep liquor having a relatively low concentration of free water at a temperature which is not lower than that at which said steep liquor would crystallize and lower than that at which the chitin would be deacetylated, the concentration of said steep liquor being such as to produce alkali chitin having 0.70 to 0.95 equivalents of alkali metal bound per acetyl hexosamine unit, removing the excess steep liquor to provide a product having a weight approximately 3 times the weight of the original chitin, and mixing the resulting product with crushed ice.

20. A method of producing alkali chitin which comprises steeping 300 grams of chitin flakes in 6 liters of a steep liquor containing 35% to 50% of sodium hydroxide at 25° C. for 2 hours, and removing the excess steep liquor to give a product having a weight approximately 3 times the weight of the original chitin.

21. A method of producing alkali chitin dispersions which comprises steeping 300 grams of chitin flakes in 6 liters of a steep liquor containing 35% to 50% of sodium hydroxide at 25° C. for 2 hours, removing the excess steep liquor to give a product having a weight approximately 3 times the weight of the original chitin, shredding the thus obtained product, and mixing the shredded material with 3 to 3.5 kgs. of crushed ice at a temperature not over 0° C. for ½ hour.

CLIFFORD J. B. THOR.